United States Patent [19]
Taskett

[11] Patent Number: 5,762,376
[45] Date of Patent: Jun. 9, 1998

[54] METHODS AND APPARATUS FOR PROVIDING A PREPAID, REMOTE ENTRY TRANSACTION INSTRUMENT HAVING MULTIPLE LANGUAGE CAPABILITY

[76] Inventor: John M. Taskett, 2673 E. Coquina Ct., Salt Lake City, Utah 84121

[21] Appl. No.: 551,814

[22] Filed: Nov. 7, 1995

[51] Int. Cl.$^6$ ............................................. B42D 15/00
[52] U.S. Cl. ............................................. 283/57; 283/65
[58] Field of Search ................... 283/117, 56, 57, 283/65, 17, 73; 379/144; 235/379, 380, 375

[56] References Cited

U.S. PATENT DOCUMENTS

| | | | |
|---|---|---|---|
| 3,556,563 | 1/1971 | Scheinberg et al. | 283/73 |
| 4,741,475 | 5/1988 | Norman | 283/73 X |
| 5,246,375 | 9/1993 | Goede | 283/73 X |
| 5,362,105 | 11/1994 | Scott | 283/65 |

*Primary Examiner*—Willmon Fridie, Jr.
*Attorney, Agent, or Firm*—Snell & Wilmer, L.L.P.

[57] ABSTRACT

A prepaid transaction instrument associated with an account database having an envelope and a card insert that a user slides into the envelope. The card insert comprises various instruction in a first language, such as English. Other information such as indicia of an authorization code for accessing the account database, indicia of an access telephone number, indicia of an issuer of the transaction instrument, and the like may also be provided on the card insert. The envelope comprises information or instruction for using the transaction instrument in a language different from the language of the card insert. Appropriately placed aperture(s) on the envelope allow the user to see vital information from the card insert such as, for example, the account database number or the access telephone number.

16 Claims, 3 Drawing Sheets

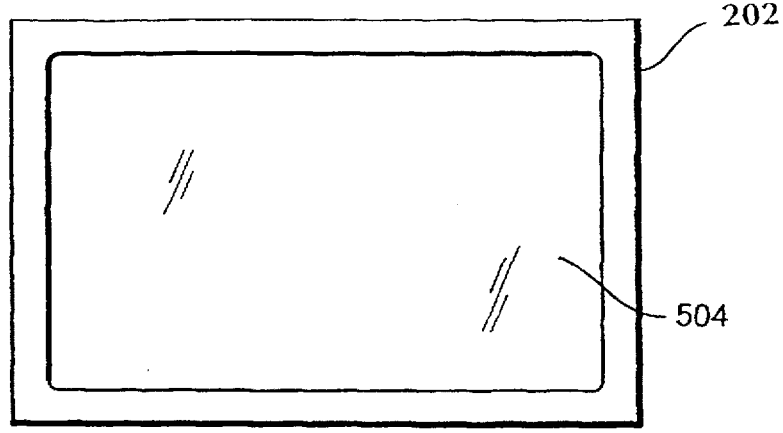

```
 1    AMERICAN EXPRESSCASH
 2      OCTOBER 15, 1994
 3     DENVER AIRPORT #3234

4   DEDUCTED $20.00 FROM
 5   4324 2345 2344 3321

6   AMERICAN EXPRESS PREPAID TELEPHONE
 7   SERVICE
 8   50 MINUTES OF DOMESTIC CALLS
 9   (EXPIRES OCTOBER 16, 1996)

10   DIAL 1-800-555-2323

11   ENTER YOUR AUTHORIZATION CODE:

12          324 432 4324
13   ||.|.|.|..|||....||...||.|.|.||.|.|||.|.|.|..||.|

14   DIAL AREA CODE + PHONE NUMBER TO CALL
15   ANYWHERE IN THE USA OR CANADA

16   TO PLACE AN INTERNATIONAL CALL DIAL
17   011 + COUNTRY CODE + CITY CODE +
18   PHONE NUMBER

19   TO MAKE ANOTHER CALL PRESS # FOR TWO
20   SECONDS.

21   FOR SERVICE OR REFUNDS CALL :
22   1-800-555-2242

23   SERVICE PROVIDED BY
24   AMERICAN EXPRESS, SALT LAKE CITY, UTAH
``` ically 5,762,376

METHODS AND APPARATUS FOR PROVIDING A PREPAID, REMOTE ENTRY TRANSACTION INSTRUMENT HAVING MULTIPLE LANGUAGE CAPABILITY

TECHNICAL FIELD

The present invention relates, generally, to prepaid, remote memory transaction instruments used by consumers to purchase goods and services which eliminates the need for cash in the transaction, and more particularly to methods and apparatus for providing information or instruction on prepaid instruments in a plurality of different languages.

BACKGROUND ART AND TECHNICAL PROBLEMS

Remote memory, prepaid accounts for use in purchasing goods and services are generally well known. Presently known schemes typically involve a printed document, for example a wallet-sized plastic or cardboard card which bears a unique authorization or account number and instructions for access to funds, services, and the like. Such prepaid cards have been used extensively throughout the world, for example as prepaid long-distance telephone calling cards.

In contrast to stored value cards (e.g., "smart cards") wherein a remaining account balance is stored within a microprocessor-controlled memory resident in the card, remote memory systems typically store information pertaining to a prepaid account at a central host computer. A typical prepaid telephone calling card includes a toll-free telephone number used by the consumer to access the host computer system, a unique authorization code associated with the card (and, hence, the corresponding remote account), and dialing instructions. When a customer desires to use the card to place a long-distance call, he dials the toll-free number, thereby accessing the host system which manages the remote accounts. By entering a predetermined authorization number, the consumer is informed by the host computer of the remaining balance. The consumer then enters the desired long distance telephone number, and the system connects the consumer with the desired calling destination. Long-distance telephone charges attributed to the telephone call are deducted from the remaining balance, and the call is terminated when the account is fully consumed.

The use of prepaid remote entry telephone cards is particularly prevalent in the United States, the cards being employed in a wide variety of applications for both personal and professional use. For example, various governmental entities and other employers often issue per diem cards to employees to accommodate employee travel; the per diem cards may be issued in predetermined amounts (e.g., $100), and permit a traveling employee to charge gasoline, rental cars, hotels, meals, and telephone calls to the prepaid account. When the charges equal the prepaid limit, the card may simply be discarded; alternatively, the card may be "recharged" by the employer, as desired. In addition, various prepaid instruments are becoming increasingly popular as gift cards, on college campuses for purchasing school and living supplies, and for use at resorts, vacation areas, theme parks, sports stadiums, and the like.

In the United States, preprinted instructions on how to use the transaction cards are generally printed directly on the cards in a single language, such as English. The use of such cards by individuals who are not conversant in the English language can be inconvenient or even impossible, depending on their fluency in the English language and their familiarity with how to use the transaction cards. While instructions may be printed on a single card in several languages, the space available to print these instructions becomes increasingly limited, especially in the case of wallet-sized prepaid transaction cards. Another option is to print instructions on a card in a single language, while printing a series of cards in a variety of different languages. However, this option has the disadvantage, among others, of requiring the allocation in advance of authorization codes for a plurality of cards printed in different languages. This may be difficult to do when the demand for the card in a particular language is unknown. Further, in the situation where transaction instruments are dispensed by ATMs or POS devices, limitations in these devices to print the cards in certain languages, such as languages using Chinese characters, is also problematic.

A system and method is thus needed which will overcome the shortcomings of the prior art.

SUMMARY OF THE INVENTION

The present invention provides methods and apparatus for conveniently and efficiently overcoming many of the shortcomings associated with the prior art. In accordance the present invention, a prepaid transaction instrument associated with an account database comprises a card configured to be inserted in an envelope or jacket.

In a preferred embodiment, the card insert includes various information fields. In the case of a prepaid telephone card, this may include information such as indicia of an authorization code for accessing the account database, indicia of an access telephone number for connecting to the database, indicia of the issuer issuing the prepaid transaction instrument, indicia of an access telephone number for accessing service information, and the like. Information such as instructions for using the prepaid transaction instrument is provided on the transaction card in a first language, such as English. The envelope comprises information or instructions for using the prepaid transaction instrument in a language different from the first language of the card insert. Apertures or openings are appropriately formed on the envelope so that pertinent information from the card insert, such as the authorization code and the access telephone number, are visible to the user when the insert is slipped inside the envelope. Of course, additional windows may also be appropriately provided on the envelope for displaying such information as the issuer of the instrument, customer service information, and the like.

Thus, a user of the prepaid transaction instrument who is not conversant in the language printed on the transaction card is nonetheless able to use the prepaid transaction instrument by using, in conjunction with the card insert, an envelope printed in the user's language. When the card is inserted into the envelope, the envelope provides both information in the user's language as well as vital information from the card insert.

In accordance with an alternate embodiment of the present invention, instruction for using the prepaid transaction instrument is provided on an envelope in a language different from the language of a card insert. In this embodiment, an aperture is appropriately placed on the envelope for showing to the user indicia of an authorization code from the card insert when the card insert is slipped inside the envelope. However, an aperture is not provided in the envelope for revealing to the user an access telephone number on the card insert. Instead, an access telephone number different from the access telephone number on the card insert is provided on the envelope for allowing the user to access and communicate with a database in a predetermined language, for example in the same or similar language as the instructions on the envelope.

In accordance with another aspect of the present invention, the envelope has a means for securing the card insert inside the envelope. This prevents the envelope and card insert from becoming separated or jostled during use. The card insert may be sealed inside the envelope either prior to or after distribution.

BRIEF DESCRIPTION OF THE DRAWING FIGURES

The present invention will hereinafter be described in conjunction with the appended drawing figures wherein:

FIG. 3 is a back view of the envelope of FIG. 2;

FIG. 4 is an alternate embodiment of a prepaid transaction insert generated by an ATM, POS device, or the like;

DETAILED DESCRIPTION OF PREFERRED EXEMPLARY EMBODIMENTS

An exemplary prepaid transaction instrument having an account database associated therewith, suitably comprises a prepaid transaction insert and an envelope or jacket for receiving the insert. Although an exemplary embodiment of the subject transaction instrument surrounds a prepaid telephone card, it will be understood that the invention is not so limited. In particular, it will be appreciated that the prepaid transaction instrument of the present invention contemplates virtually any type of prepaid transaction instrument or methodology for virtually any type of goods or services of whatever kind or nature.

Prepaid calling card instruments may be purchased from a variety of retail outlets, for example convenience stores, drug stores, gas stations, supermarkets, and the like. Alternatively, presently known ATMs, POS devices, and the like may be conveniently configured in accordance with the present invention to print a telephone card insert; hence, the insert may be analogous in its physical embodiment to a receipt of the type typically printed by an ATM at the conclusion of an ATM transaction. For a more thorough discussion of prepaid instruments and telephone cards, see copending U.S. patent application Ser. No. 08/456,525 entitled *Methods and Apparatus for Providing a Prepaid, Remote Memory Customer Account*, and Ser. No. 08/458, 715 entitled *Refundable Prepaid Telephone Card*, both filed Jun. 1, 1995, by John Taskett. See also, copending application Ser. No. 08/510,196 entitled *Methods and Apparatus for Providing a Prepaid, Remote Entry Customer Account for the Hearing Impaired*, filed in the name of John Taskett on Aug. 2, 1995, and Ser. No. 08/510,590 entitled *Methods and Apparatus for Providing a Prepaid, Remote Entry Customer Account for the Visually Impaired*, filed in the names of John Taskett and Barbara Piernot on Aug. 2, 1995. The entire disclosures of these patent applications are incorporated herein by this reference.

Figure 1:
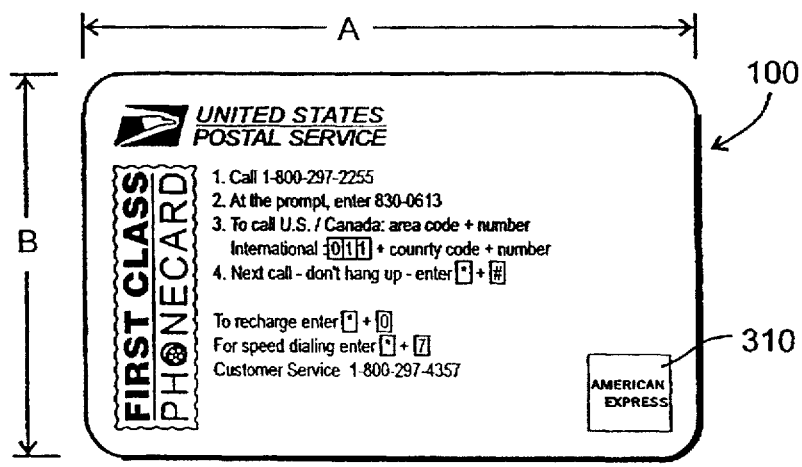
FIG. 1 is an exemplary prepaid transaction insert in accordance with the present invention.

Referring now to FIG. 1, prepaid transaction insert 100 may be configured to display various information pertaining to the prepaid account, depending on the nature of the prepaid transaction instrument, the manner in which insert 100 is generated, the nature and identity of the instrument issuer, the nature of the goods and services to be purchased using the instrument, and the like. In FIG. 1, insert 100 is analogous in its physical embodiment to a credit card-like instrument and may be comprised of paper, plastic, cardboard or any other convenient material.

In accordance with the illustrated embodiment, transaction card 100 comprises printed instructions to the user to dial an access telephone number (line 1). Card 100 thereafter instructs the user to enter a predetermined authorization code (line 2) which is suitably unique to a particular prepaid transaction instrument. The user is then instructed to dial a desired destination telephone number (line 3). Transaction card 100 may then instruct the user as to how to place additional calls (line 4). Further, instruction on how to recharge or add additional time to the transaction instrument, how to use the speed dial feature, how to contact customer service, and any other desired features may also be provided.

If desired, one or more trademarks or service marks 310 may be suitably employed on card 100 for displaying a mark of the issuer or for advertising various related or unrelated products.

With continued reference to FIG. 1, a preferred transaction card 100 suitably exhibits a length on the order of 8.5–8.7 cm (dimension "A"), a height on the order of 5.3–5.5 cm (dimension "B"), and a thickness on the order of 0.65–0.85 mm.

Figure 2:
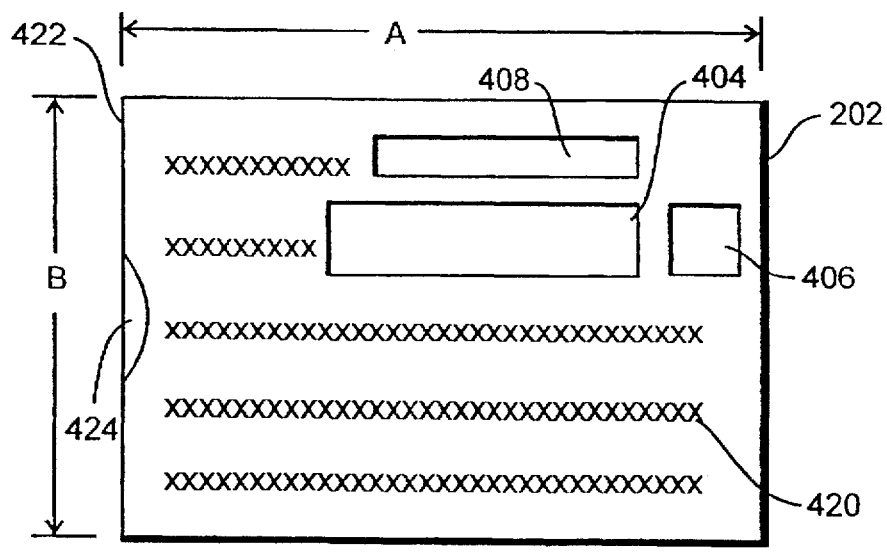
FIG. 2 is a front view of a sleeve or envelope for use with the transaction insert of FIG. 1 in accordance with the present invention.

Referring now to FIG. 2, a front-view of a language envelope 202 for accommodating insert 100 suitably comprises various information or instructions 420 to facilitate use of the prepaid transaction instrument, printed in a language readable by the user.

In accordance with the illustrated embodiment, an aperture 404 is provided on envelope 202 for displaying to the user the authorization code found on insert 100 when card 100 is inserted into envelope 202. In addition, an aperture 408 is appropriately placed on envelope 202 so the access phone number printed on card 100 is shown to the user. If desired, other apertures may also be provided on envelope 202, such as an aperture 406 for revealing symbol 310 printed on insert 100.

In a preferred embodiment of the present invention, instructions 420 are suitably printed in a different language from the instructions printed on insert 100. Sets of envelopes 202 may then be printed in a plurality of different languages and distributed to users of the transaction instrument who are conversant in a language different from the language printed on transaction insert 100. Thus, by having a user of the prepaid transaction instrument simply slide envelope 202 (which is printed in the user's language) over card insert 100, the user is able to use transaction card 100 despite it being printed in a different language.

In accordance with another aspect of the invention, instructions 420 on envelope 202 may be in a language similar to the language on transaction insert 100. For example, if after the issuance of insert 100 the issuer the prepaid transaction instrument changes one or more of the manner in which the instrument is to be used, the access telephone number, or adds additional services or features to the instrument, the issuer may simply produce envelopes 202 with the new instructions or information printed on the envelope. The user may then slide one of these envelopes over transaction card 100, thus eliminating the need for the issuer to issue new transaction cards to all of the users.

In accordance with still another aspect of the present invention, envelope 202 has a means for sealing or securing insert 100 inside envelope 202. Insert 100 may then be sealed within envelope 202 either prior to or after distribution of the prepaid transaction instrument. For example, cards printed in English may be sealed in a Chinese envelope before being shipped to China or a Chinese community. By sealing the insert within the envelope before shipment, the insert/envelope combination may be prevented from becoming separated during shipment. If a subsequent purchaser of the transaction instrument prefers to use the English instructions, the Chinese envelope may be opened, the English insert removed, and the Chinese envelope discarded. On the other hand, if insert 100 and envelope 202 are distributed separately, the user of the transaction instrument may secure insert 100 within envelope 202 to prevent the two from becoming jostled or separated during use. In a preferred embodiment, one side of envelope 202 has a flap with an adhesive that may be folded over and secured to the opposite side of envelope 202. A person skilled in the art, however, will appreciate that other means for securing insert 100 within envelope 202 are also possible, such as using a strip of adhesive tape, distributing adhesive within the inside portion of envelope 202, using staples or fasteners, and the like.

With continued reference to FIG. 2, envelope 202 has approximately the same dimensions as the dimensions of insert 100 of FIG. 1. The length of jacket 202 is suitably on the order of 8.5–8.7 cm (dimension "A"), and the height is on the order of 5.3–5.5 cm (dimension "B"). While a preferred embodiment of envelope 202 comprises Tyvek, a durable, high lubricity material that is resistant to tear, other appropriate type materials such as paper, cardboard, plastic, or the like may also be employed.

With continued reference to FIG. 2, sleeve 202 comprises at least one opening 422 along an edge of the sleeve for allowing insert 100 to be slid into envelope 202 by the user. Further, a slot or cut-out 424 may be provided at opening 422 for allowing the user to both easily insert and remove transaction card 100 from sleeve 202.

Turning now to FIG. 3, in accordance with another aspect of the invention, at least a portion 504 of a back side of envelope 202 may comprise a transparent material that allows the user of the transaction instrument to view any images, designs, or information that may be present on the back face of insert 100.

Referring now to FIG. 4, an alternate embodiment of the present invention is shown in which an insert 101 is generated by an ATM. In the illustrated embodiment, insert 101 suitably embodies information pertaining to the issuer of the instrument (line 1), the date and/or time of issuance (line 2), and the location of the machine which issued the instrument with virtually any degree of specificity (line 3).

In addition, the prepaid amount (line 4) as well as the source of the funds (line 5) (e.g., checking account number) may also be set forth. In this regard, it may be desirable under certain circumstances to allow the purchaser of the instrument to select the prepaid amount from a predetermined menu, which may include values of $5.00, $20.00, $100.00, or any desired amount.

Alternatively, in circumstances where a prepaid instrument is purchased through an ATM, PC, POS, or other modality which permits the user to interactively configure one or more of the parameters associated with the card, it may be desirable to allow the consumer to enter any particular amount (e.g., $34.77, $3,409.20) to precisely conform to the value of the transaction for which the instrument is used. By eliminating the need for the merchant to give change back to the purchaser, the use of the cash may be entirely avoided.

With continued reference to FIG. 4, a brief description of the nature of the instrument may be set forth (lines 6–8), including, if desired, the number of minutes of long distance calls provided by the instrument, if appropriate (line 8). In certain applications, it may also be desired to set forth the expiration date (line 9) or any other relevant parameters or characteristics pertaining to the instrument and the nature of its intended use.

In accordance with a further aspect of the present invention, user friendly instructions may be set forth on insert 101 to explain to the user how the instrument is to be used to effect transactions. In accordance with the illustrated embodiment, insert 101 suitably sets forth dialing instructions for permitting a user to employ the instrument to make long distance telephone calls. More particularly, insert 101 instructs the user to dial a telephone number (line 10), for example, a toll-free 800 number, to access the host computer which maintains the account from which "funds" are "withdrawn" or otherwise consumed as a consequence of the long-distance telephone calls made in accordance with the instrument. Insert 101 thereafter instructs the user (line 11) to enter a predetermined authorization code (line 12) which is preferably unique to a particular instrument. In accordance with a further aspect of the present invention, a bar code (line 13) or other suitable indicia of an authorization code may also be exhibited on insert 101, for example to permit its use with bar code readers, as discussed in greater detail below.

Insert 101 is further configured to instruct the user to dial a desired destination telephone number (lines 14–15); insert 101 may optionally provide additional instructions for international calls, subsequent calls without hanging up or any other described feature (lines 16–20). If desired, insert 101 may also instruct the user to contact a customer service number (lines 21–22) as desired.

Given the robust configuration of the present invention, virtually any additional information, data, or even advertising may be set forth on insert 101 (e.g., lines 23–24).

Figure 5:
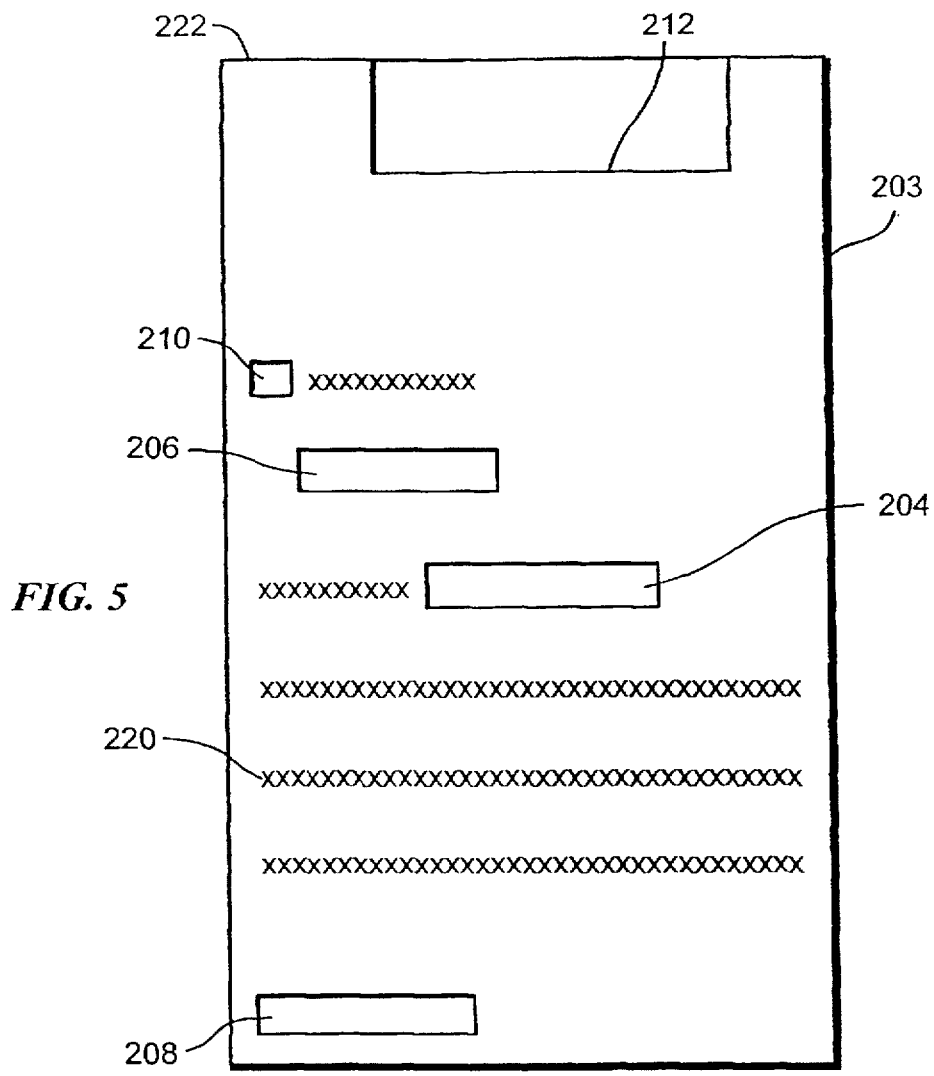
FIG. 5 is a front view of a sleeve designed for use in conjunction with the transaction insert of FIG. 4.

Referring now to FIG. 5, an envelope or sleeve 203 for receiving transaction insert 101 of FIG. 4 suitably exhibits dimensions similar to transaction insert 101 so as to keep the size of the transaction instrument to a minimum. Envelope 203 comprises printed instruction 220 relating to the manner of use of the prepaid transaction instrument. Instruction 220 may be in the same language as the instruction (FIG. 4, lines 10–22) found at insert 101 or, as is in a preferred embodiment, instruction 220 may be in a language different from the language of insert 101.

With continued reference to FIG. 5, envelope 203 may be comprised of any appropriate material such as paper, cardboard, plastic, or the like. In a preferred embodiment, envelope 203 is comprised of Tyvek.

Envelope 203, as shown in FIG. 5, has appropriately placed aperture(s) for allowing the user to view pertinent information from transaction card 101 when it is inserted into envelope 203. For example, an aperture 204 allows the user of the transaction instrument to see the authorization code from transaction card 101. An access telephone number may then be provided in instruction 220 on envelope 203 for allowing the user to communicate with the account database in a same or similar language as that printed on envelope 203. When prompted to do so by the host computer, the user can then enter the authorization code to allow access into the account database.

In another embodiment of the invention, the user accesses the account database using the same access phone number as shown at transaction card 101 (FIG. 4, line 10). In this instance, an aperture 206 is appropriately provided on envelope 203 for revealing to the user the access phone number printed on insert card 101. Additionally, other important information from card 101 may be made visible to the user of the prepaid transaction instrument through other apertures on envelope 101. For example, an aperture 208 may provide the phone number for customer service. An aperture 210 may be appropriately placed on envelope 203 to provide the number of minutes of long distance calls provided by the instrument. An aperture 212 may be appropriately placed to reveal to the user the name of the issuer of the instrument, the date and/or time of issuance, the location of the ATM machine which issued the instrument, and the like.

Figure 6:
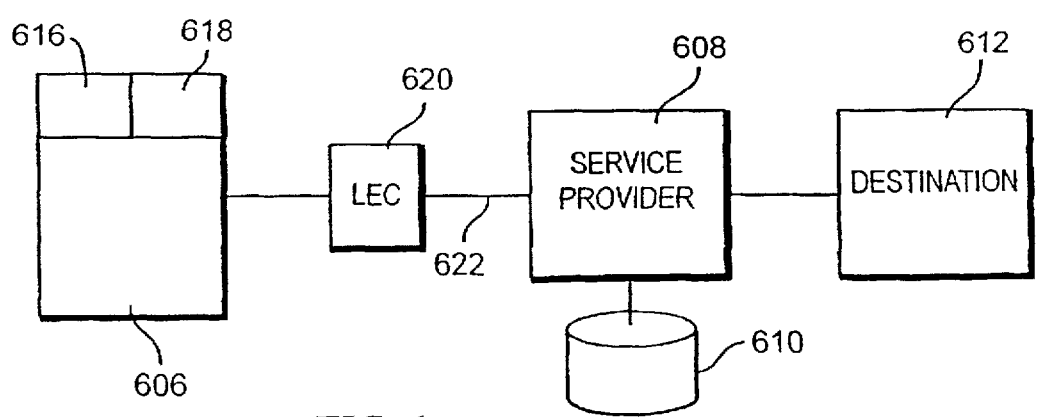
FIG. 6 is a schematic block diagram of the present invention wherein a prepaid transaction instrument is used in the context of a long-distance telephone service system.

FIG. 6 illustrates an exemplary distributed transaction system in accordance with the present invention. This system suitably comprises a host computer network (service provider) 608 having a database 610 associated therewith, and a calling party module 606 configured to communicate with the host's system via communications link 622. In a preferred embodiment where caller module 606 comprises a telephone, PC or other modem-equipped apparatus, the caller is suitably routed to service provider 608 by way of a Local Exchange Carrier (LEC) 620. In an alternate embodiment, caller module 606 may comprise a teletype (TTY) device used by the hearing impaired to communicate telephonically, whereupon the TTY device may establish communication with host 608 through a conventional telephone hook up via LEC 620 or, alternatively, the TTY may be routed to the service provider by way of an intervening Relay Service, for example a government or private industry sponsored relay service for facilitating communication between hearing impaired persons and other hearing impaired persons, data networks, or voice telephone extensions.

In accordance with one aspect of the present invention, the functions of service provider 608 may suitably be performed by a financial institution, credit card issuer, or other entity issuing prepaid transaction instruments. Those skilled in the art will appreciate that service provider 608 includes suitable computing hardware for effecting the functions set forth herein. Specifically, database 610 is advantageously configured to manage various aspects of the prepaid accounts in the context of the present invention. For example, database 610 may include storage capacity for information relating to the various calls charged to each account managed by service provider 608.

With continued reference to FIG. 6, a user may use the information found on envelope 202 as well as that displayed through various apertures to place long distance telephone calls in the context of the distributed processing systems set forth in FIG. 6 in the following manner.

In a preferred embodiment, data entry module 606 suitably comprises a conventional touch tone telephone; alternatively, data entry module 606 may comprise a PC or any other suitable data entry terminal capable of interfacing with a telephone line 622. The user in possession of the transaction instrument executes the instructions set forth on envelope 202 through an appropriate keypad 616 associated with telephone 606. In an alternate embodiment, it may be desirable to enter certain data into data entry terminal 606 through an alternative input/output modality 618, for example by reading bar code data, magnetic stripe data, voice recognition, TTY, or any other suitable medium.

In the illustrated embodiment, upon dialing the access number (FIG. 1, line 1; FIG. 4, line 10), the telephone call is routed by the Local Exchange Carrier (LEC) 620 to service provider 608 associated with the aforementioned toll free telephone number. If desired, service provider network 608 may be configured to interactively request information from the user, for example through the use of voice prompts, text prompts, tones, icons, or the like. In a preferred embodiment, the user enters data into data entry module 606 through keypad 616; however, it may also be desirable under certain circumstance to employ voice recognition circuitry within service provider 608 to permit the user to "speak" information into data entry terminal 606. In any event, once the information pertaining to the authorization code (FIG. 1, line 2; FIG. 4, line 12) is received by the service provider 608, a correlation is made between the authorization code and a particular account resident in database 610. Upon determining the current available "balance" in the account, the service provider may inform the user of the amount of long distance time available in the account or any other relevant parameter.

Upon entering the desired destination telephone number into data entry terminal 606, either in response to a voice prompt from service provider 608 (or through screen displays in the embodiment wherein data entry terminal 606 is a PC), service provider 608 connects or otherwise permits the connection of telephone 606 with a requested destination telephone extension 612. In the illustrated embodiment, destination 612 suitably corresponds to the telephone extension of the area code and phone number entered into data entry module 606 by the user. During the course of successive long distance telephone calls, service provider 608 incrementally decreases the available balance in the user's account until the account is fully withdrawn, at which time service provider 608 may inform the calling party that the account is fully withdrawn and either invite the calling party or the called party to make other arrangements for payment in order to continue the call, or simply terminate the call.

In the embodiment shown in FIG. 6, service provider network 608 comprises telephone switching equipment suitable for connecting long distance telephone calls. Alternatively, service provider 608 may be connected electronically to a remote long distance carrier (not shown) in order to facilitate the completion of long distance telephone calls.

With continued reference to FIG. 6, in accordance with an alternative embodiment of the present invention, destination 612 may comprise virtually any "destination", for example a telephone, modem, or facsimile extension, a TTY, an e-mail destination, a service provider, or a provider of data or information. In this regard, and as briefly discussed above, data entry module 606 may comprise a PC or other processing terminal configured to access a telephone or data network through hardware link 622. In accordance with this alternative embodiment, destination 612 may be suitably configured to download data or information to PC 606 from a physically distant source, for example in the context of the Internet or other data network accessible to both the host computer and the party requesting summary data. Moreover, the account maintained by service provider 608 relating to the transaction instrument used by the user to access destination 612 may also be employed to essentially pay for the data downloaded by destination 612 into PC 606. That is, although service provider 608 is equipped to credit value from a particular account in respect of long distance telephone charges, service provider 608 may also be conveniently configured to credit dollar values from the caller's account to a second account maintained by service provider 608 in respect of destination 612. In this way, the transaction instrument may be employed by the user to, in effect, pay for data downloaded by destination 612 to PC 606 under the control of (or at least facilitated by) service provider network 608.

Although the present invention is set forth herein in the context of the appended drawing figures, it should be appreciated that the invention is not limited to the specific forms shown. Various other modifications and enhancements in the design and arrangement of the various components, processes, steps and descriptions thereof as set forth herein may be made without departing from the spirit and scope of the present invention as set forth in the appended claims.

What is claimed is:

1. A prepaid transaction instrument having an account database associated therewith, comprising:
    a transaction card having a front face and a back face including:
        indicia of an authorization code for accessing said account database on said front face of said transaction card; and
        a first printed instruction on said front face of said transaction card setting forth a manner in which said instrument may be used by a consumer for subsequently accessing said account database, wherein said printed instruction is in a first language;
    an envelope for receiving said transaction card therewithin having a front side and a back side, said front side defining an appropriately placed aperture for revealing said indicia of said authorization code and said front side of said envelope further including a second printed instruction on said front side of said envelope setting forth said manner in which said instrument may be used by a consumer for subsequently accessing said account database, wherein said second printed instruction is in a second language.

2. The transaction instrument of claim 1 wherein said transaction card comprises indicia of an access telephone number which facilitates use of said transaction instrument by the consumer in said first language and said envelope comprises indicia of an access telephone number which facilitates use of said transaction instrument by the consumer in said second language.

3. The transaction instrument of claim 1 further comprising indicia of an access telephone number on said front face of said transaction card and an aperture at said front side of said envelope for revealing said indicia of said access telephone number.

4. The transaction instrument of claim 3 further comprising indicia of an issuer of said instrument on said front face of said transaction card and an aperture at said front side of said envelope for revealing said indicia of said issuer.

5. The transaction instrument of claim 4 wherein said transaction card comprises plastic and has a length on the order of 8.5 to 8.7 cm, a height on the order of 5.3 to 5.5 cm, and a thickness on the order of 0.65 to 0.85 mm.

6. The transaction instrument of claim 5 wherein said envelope comprises Tyvek.

7. The prepaid transaction instrument of claim 6 wherein said envelope comprises only one opening for receiving said transaction card.

8. The prepaid transaction instrument of claim 7 wherein said envelope further comprises a slot at said opening for allowing the consumer to easily remove said transaction card from said envelope.

9. The prepaid transaction instrument of claim 8 wherein said back face of said transaction card comprises an image and at least a portion of said back side of said envelope comprises a transparent material for allowing said image to be seen by the consumer.

10. A prepaid telephone card comprising:
    an insert, including:
        indicia of an authorization code on said insert for accessing an account database; and
        first means for instructing a consumer on how to access the account database in a first language; and
    means for containing said insert, said containing means comprising second means for instructing a consumer on how to access the account database in a second language and defining an aperture for revealing said indicia of said authorization code when said insert is enclosed by said containing means.

11. The transaction instrument of claim 10 further comprising indicia of an access telephone number on said insert and an aperture at said containing means for revealing said indicia to the consumer.

12. The transaction instrument of claim 11 wherein said containing means has only one opening for receiving said insert and is comprised of Tyvek.

13. A method for preparing a prepaid transaction instrument having an account database associated therewith, comprising the steps of:
    providing a transaction card having a front face and a back face;
    providing indicia of an authorization code for accessing said account database and a first instruction setting forth a manner in which said instrument may be used by a consumer for subsequently accessing said account database on said front face of said transaction card;
    providing an envelope for receiving said transaction card having a front side and a back side, said front side defining an appropriately placed aperture for revealing said indicia of said authorization code; and
    printing a second instruction on said front side of said envelope setting forth said manner in which said instrument may be used by a consumer for subsequently accessing said account database.

14. The method of claim 13 further comprising the steps of:
    printing indicia of an access telephone number on said front face of said transaction card; and
    providing an aperture at said front side of said envelope for revealing said indicia of said access telephone number.

15. The method of claim 14 further comprising the steps of:
    printing indicia of an issuer of said instrument on said front face of said transaction card; and
    providing an aperture at said front side of said envelope for revealing said indicia of said issuer.

16. The method of claim 15 further comprising the steps of:
    providing an opening at a top of said envelope for receiving said transaction card; and
    providing a slot at said opening for allowing the consumer to easily remove said transaction card from said envelope.

* * * * *

UNITED STATES PATENT AND TRADEMARK OFFICE
CERTIFICATE OF CORRECTION

PATENT NO. : 5,762,376
DATED : June 9, 1998
INVENTOR(S) : John M. Taskett

It is certified that error appears in the above-identified patent and that said Letters Patent is hereby corrected as shown below:

On the title page, Item [75], after "Inventor" please insert --Assignee: American Express TRS New York, N.Y.--

Signed and Sealed this

Thirteenth Day of July, 1999

Attest:

Attesting Officer

Q. TODD DICKINSON

Acting Commissioner of Patents and Trademarks